(12) United States Patent
Alba

(10) Patent No.: US 8,307,025 B2
(45) Date of Patent: Nov. 6, 2012

(54) METHOD FOR SERVICE ORIENTED DATA EXTRACTION TRANSFORMATION AND LOAD

(75) Inventor: Alfredo Alba, Morgan Hills, CA (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 12/129,211

(22) Filed: May 29, 2008

(65) Prior Publication Data

US 2008/0294790 A1    Nov. 27, 2008

Related U.S. Application Data

(63) Continuation of application No. 11/624,893, filed on Jan. 19, 2007.

(51) Int. Cl.
  *G06F 7/00* (2006.01)
  *G06F 15/16* (2006.01)
  *G06F 15/173* (2006.01)

(52) U.S. Cl. ........ 709/200; 707/602; 709/201; 709/217; 709/223

(58) Field of Classification Search .............. 707/1, 100, 707/602; 709/217–219, 223–226, 231, 203, 709/201
See application file for complete search history.

(56) References Cited

U.S. PATENT DOCUMENTS

| | | | |
|---|---|---|---|
| 6,032,158 A * | 2/2000 | Mukhopadhyay et al. | ... 707/201 |
| 6,076,088 A | 6/2000 | Paik et al. | |
| 6,349,276 B1 | 2/2002 | McCarley | |
| 6,584,464 B1 | 6/2003 | Warthen | |
| 6,604,110 B1 * | 8/2003 | Savage et al. | ................. 707/602 |
| 6,701,294 B1 | 3/2004 | Ball et al. | |
| 7,117,215 B1 * | 10/2006 | Kanchwalla et al. | ......... 707/602 |
| 2003/0069880 A1 | 4/2003 | Harrison et al. | |
| 2003/0135516 A1 * | 7/2003 | Goodwin et al. | ......... 707/103 R |
| 2003/0188264 A1 * | 10/2003 | Nawathe et al. | ............... 715/513 |
| 2006/0106856 A1 * | 5/2006 | Bermender et al. | .......... 707/102 |
| 2006/0136354 A1 * | 6/2006 | Bell et al. | .......................... 707/1 |
| 2007/0078877 A1 * | 4/2007 | Ungar et al. | .................. 707/101 |

* cited by examiner

*Primary Examiner* — Ian N Moore
*Assistant Examiner* — Jenee Alexander
(74) *Attorney, Agent, or Firm* — Cantor Colburn LLP

(57) ABSTRACT

The present invention relates to a method for the configurable real time transformation of dissimilar data sources, the method further consisting of the steps of acquiring real time information pertaining to at least one data source, wherein the information comprises reference information that is associated with the data source, data transformation specification information that is associated with the data source, and scheduled event specification information that is associated with the data source, and maintaining the data source information. The method further comprises the steps of acquiring data from the data source in accordance with a specified scheduled event, converting the acquired data into a predetermined standardized format, performing at least one data transformation function from the real time stream upon the converted data in accordance with the acquired data transformation specification information that was associated with the data source; and transmitting the transformed data to a destination data source.

1 Claim, 3 Drawing Sheets

METHOD FOR SERVICE ORIENTED DATA EXTRACTION TRANSFORMATION AND LOAD

CROSS REFERENCE TO RELATED APPLICATIONS

This application is a continuation of U.S. patent application Ser. No. 11/624,893 filed Jan. 19, 2007, the contents of which are incorporated by reference herein in their entirety.

BACKGROUND OF THE INVENTION

1. Field of the Invention

This invention relates to methodologies for extracting data from data sources on a network and particularly to, methodologies for service oriented data extraction and data transformation.

2. Description of Background

Before our invention, large business enterprises typically implemented a plurality of dissimilar data sources within their operational networks, in addition to interacting on a daily basis with a wide variety of external business sources (such as business transactions or structured data acquisition processes). The sharing, acquisition, transformation, and migration of managed data comprises significant costs that are associated with such activities. Incorporating new data feeds, or enabling new business transactions is usually a costly and lengthy process. Once a business enterprise has decided on a specific product, or product line for data management, it is often very difficult to migrate to a simpler, better, or more cost effective solution because of configuration differences between the existing and proposed data schemas.

Automated tools that are utilized for managing a business enterprise's data efficiently are a necessity in today's business environment. One classification of tools that is frequently used are stand-alone proprietary data transformation and schema mapping applications. Such tools are used to provide a configurable data transformation processes for data migration, sharing, and reporting, in addition to performing mapping operations for business transactional operations. These tools provide the means to achieve their configuration goals provided they are compatible with both the source and the destination data sources, in addition to being compatible with the available operating environment. While such automated tools provide valuable functionality, they remain proprietary; and further, they lack the flexibility and adaptability needed in today's business environment.

Therefore, there exists a need for a flexible service oriented solution to reduce the overall cost that is associated with data migration, sharing, reporting and mapping.

SUMMARY OF THE INVENTION

The shortcomings of the prior art are overcome and additional advantages are provided through the provision of a method for the configurable real time transformation of dissimilar data sources, the method further consisting of the steps of acquiring real time information pertaining to at least one data source, wherein the information comprises reference information that is associated with the data source, data transformation specification information that is associated with the data source, and scheduled event specification information that is associated with the data source, and maintaining the data source information.

The method further comprises the steps of acquiring data from the data source in accordance with a specified scheduled event, converting the acquired data into a predetermined standardized format, performing at least one data transformation function from the real time stream upon the converted data in accordance with the acquired data transformation specification information that was associated with the data source; and transmitting the transformed data to a destination data source.

Computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

One or more exemplary embodiments of the invention are described below in detail. The disclosed embodiments are intended to be illustrative only since numerous modifications and variations therein will be apparent to those of ordinary skill in the art. In reference to the drawings, like numbers will indicate like parts continuously throughout the views.

Aspects of the present invention relate to systems and methodologies for the configuration and implementation of data extraction transformation and data load tool solutions for business enterprises. As such, a flexible service oriented solution to reduce the overall cost associated with data migration, sharing, reporting and mapping is presented. By allowing a dynamic, real-time reconfiguration, and operations of the extract, transform and load (ETL) processing landscape, aspects of the present invention have the capability to provide a business enterprise with the capacity to adapt to an ever changing business environment at a much lower cost. The present invention provides solutions that can be synergistically utilized to quickly enable new business transactions in addition to reducing the cost and time of migrations to more cost effective data management solutions.

Within aspects of the present invention reference, transformation, schedule, and real time specifications of remote or local data sources are created and maintained within the inventive system. On the specified schedule, remote or locally stored data is extracted and uploaded to the destination data source(s). Specifically, within embodiments of the present invention, the extracted data is normalized in a per fact basis into a XML document. The normalized XML data/document is transformed into a desired format according to transformation specifications that have been associated with the extracted data. Thereafter, the transformed data is loaded to a destination data source.

Aspects of the present invention are carried out within a computing system environment. The computer system as operated by a system user can embody a conventional personal computer on which a Web services based application that is configured to accomplish the objectives of the present methodologies is operating. As is conventional, the computer system also includes other hardware and software elements that are conventionally included in personal computers.

Figure 1:
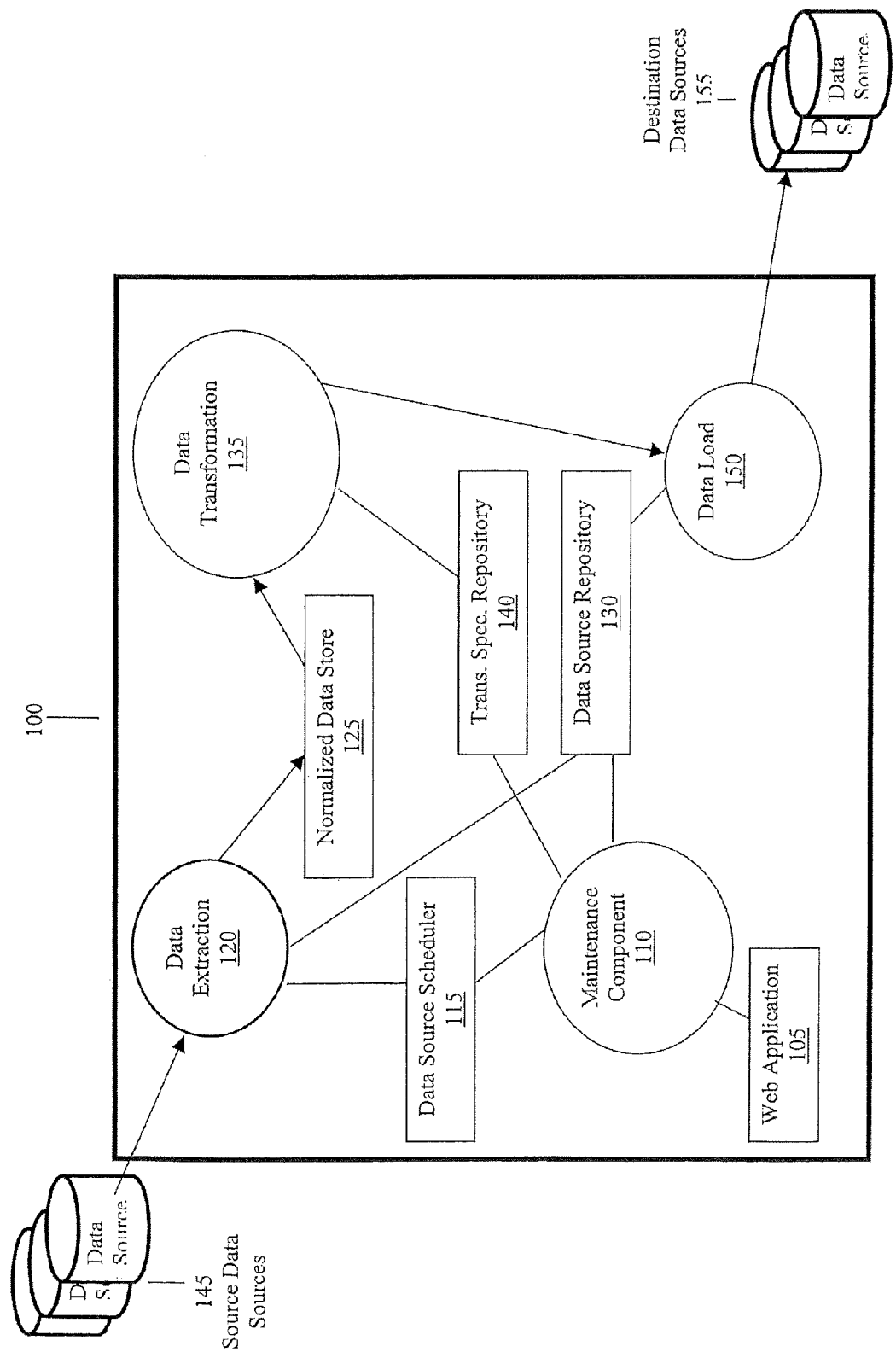
FIG. 1 illustrates one example of aspects of the architecture of an embodiment for service oriented data extraction transformation.

Turning now to the drawings in greater detail, it will be seen that in FIG. 1 there is diagram detailing structural hardware and software components that may be implemented within embodiments of the present invention. As shown in FIG. 1, the present invention may embody a web services-based application 105, wherein the web services-based application 105 comprises a plurality of software processing components. Specifically, the web services-based application 105 comprises a maintenance component 110, wherein the function of the maintenance component 110 is to monitor the operations of the data source scheduler 115, the transformation specification repository 140, and the data source repository 130.

Further comprised, are a data extraction component 120, a data transformation component 135, and a data load component 150. Source data that is to be processed within the system is extracted from a source data source 145, normalized into a predetermined data format at a normalized data store 125, and eventually uploaded to the specified destination data source(s) 155.

A comprehensive listing of data sources that the system is configured to extract data from is stored at the data source repository 130. Within aspects of the present invention the data extractor 120 acts to gather specified data from a data source 145 that is referenced at the data source repository 130. The extraction operation can either be initiated at the will of a system operator, or as part of a scheduled event that has been notated by the data source scheduler 115. Specifically, a data extraction operation comprises the function of fetching data from a data source 145. The data is extracted from the specified data source 145 at a rate that complies with the performance limitations of the remote data source host 145. Thereafter, the extracted data is transmitted to the normalized data store 125, where the extracted data is normalized and stored into XML documents.

The normalized data is retrieved from the normalized data store 125 by the data transformation component 135. Thereafter, the normalized data is transformed according to a set of data transformation rules that are contained within a data transformation specification. Data transformation specifications are stored and maintained at the transformation specification repository 140. Further, within embodiments of the present invention, data transformation specifications can be altered, or modified by a system operator at the time of the execution of the transformation of the normalized data. Essentially, data transformation is defined as the processes of converting normalized data into its final form prior to the data load component's 150 operation of transmitting (i.e., inserting or updating) the transformed data to its final destination data source.

Within yet further aspects of the present invention, there are specific protocols in place to assist in the remote or local storage and maintenance of data source references. In particular, data source references can be stored along with all the properties necessary to establish a proper connection for the data extraction operation, including any such credentials that are necessary for a successful extraction process.

Figure 2:
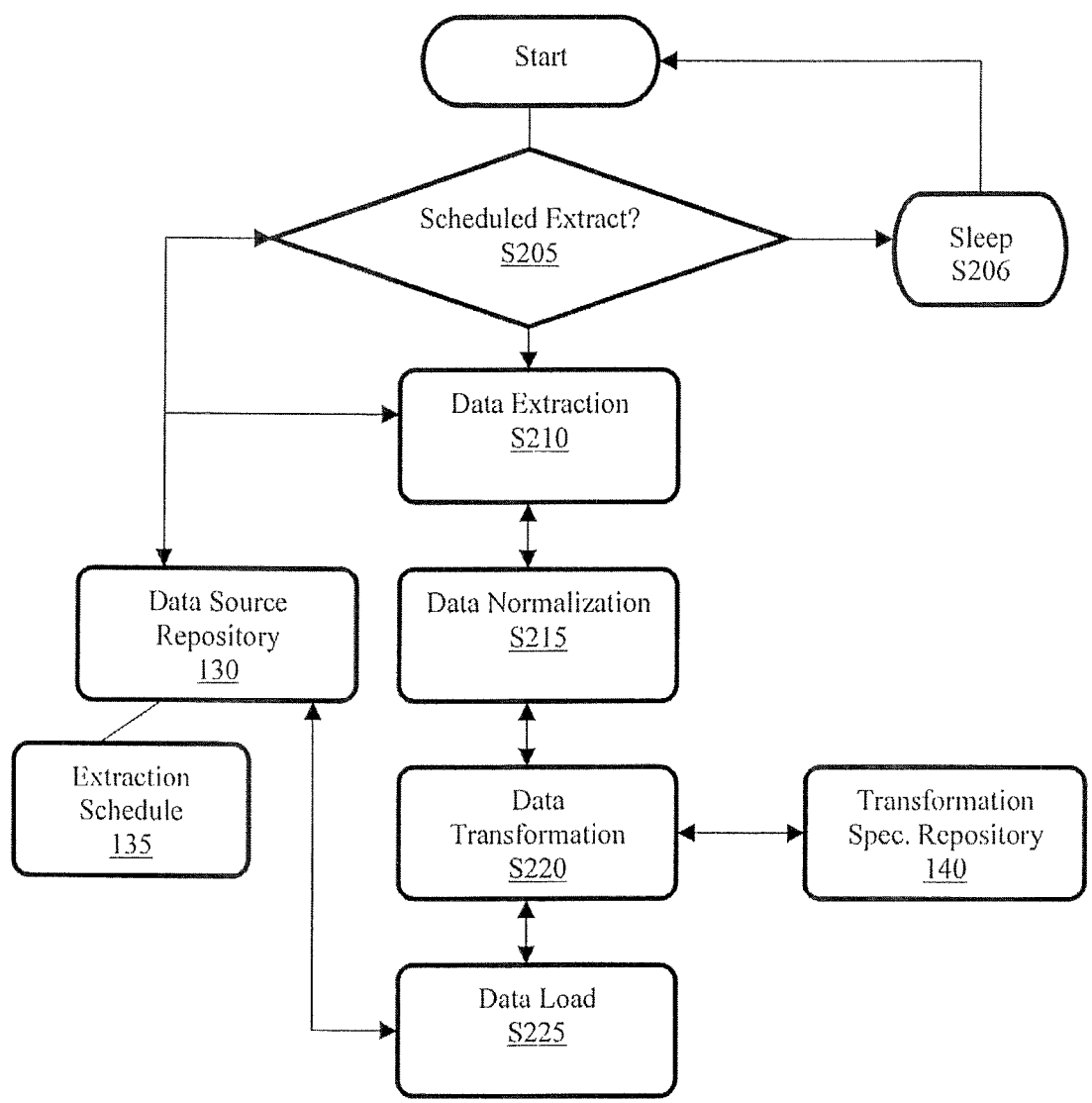
FIG. 2 illustrates one example of a data flow diagram illustrating aspects of a scheduled data extraction functionality comprised within embodiments of the present invention.

FIG. 2 shows a flow diagram that illustrates aspects of a scheduled data extraction process that the present invention may be configured to perform. At step 205, a determination is made as to whether a data extraction event is scheduled. As a result, the data extraction schedule 135 of the data source repository is accessed to confirm the inquiry. In the event that there is no scheduled data extraction to be performed, at step 206, the system goes into a sleep mode. In the event that it is determined that a data extraction operation is scheduled to be performed, then at step 210, the data source 145 is contacted, and summarily the specified source data is extracted. The extracted data is thereafter normalized (step 215), and transformed according to the data transformation specification instructions that are stored at the transformation specification repository 140 (step 220). At step 225, the transformed data is loaded to the destination data source 155, and the extraction schedule 135 is updated in regard to the performed data transformation operation.

Figure 3:
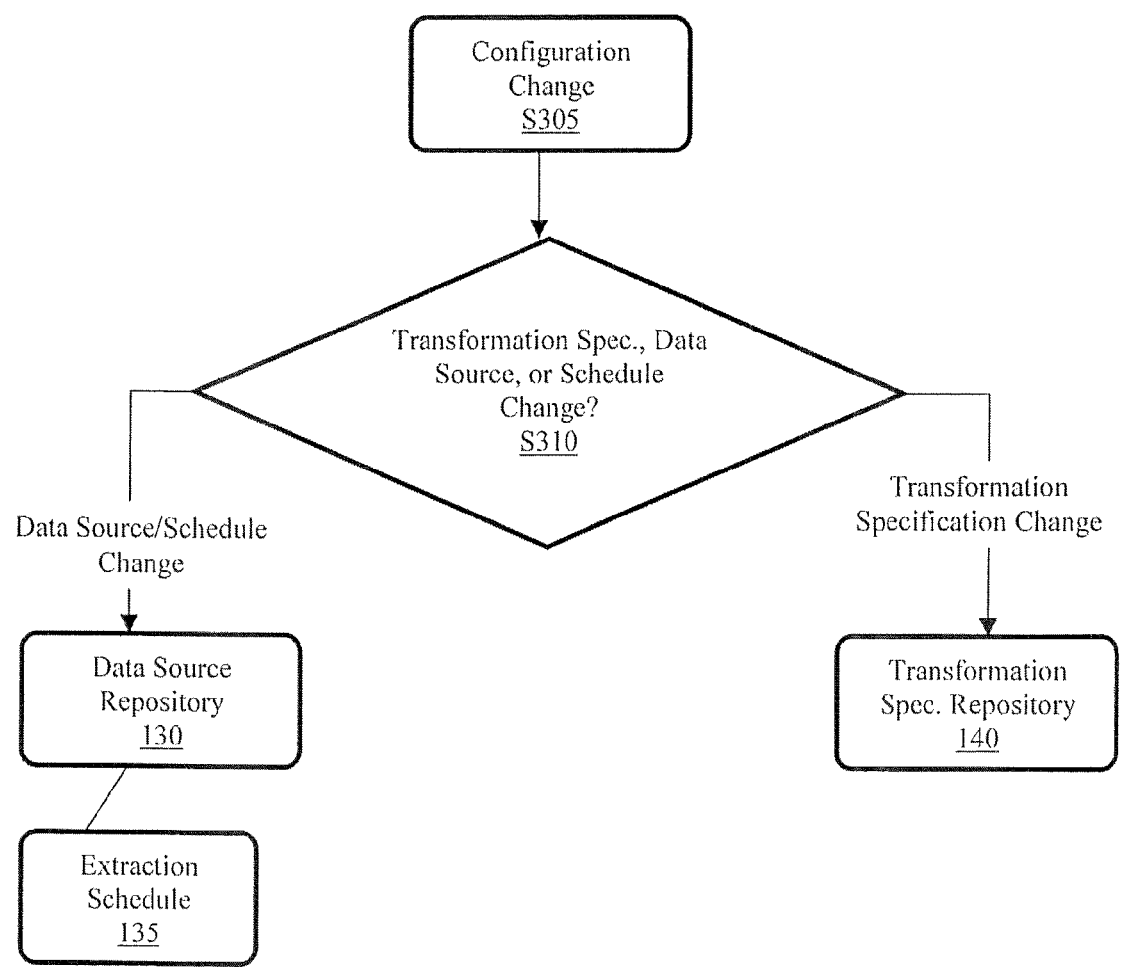
FIG. 3 illustrates one example of a flow diagram detailing aspects of a change data flow functionality comprised within embodiments of the present invention.

FIG. 3 shows a flowchart detailing aspects of a method for updating the information that is stored at the transformation specification repository 140, the data source repository 130, and the data extraction schedule 135. Within aspects of the present invention, in the event of any change to a data extraction schedule, data source reference, or data transformation specification, the modification information is initially submitted to the maintenance module 110, wherein thereafter the appropriate registry is updated. As shown at step 305, a configuration change has been initiated. At step 310, a determination is made to determine what type of configuration modification is to be made. In the event that the change is to be made to the data transformation specification, then the transformation repository 140 is accessed and the modifications are performed. In the event that the changes are to be made to the data source repository 130 or the extraction schedule 135, then the elements are respectively accessed and the modification to the configuration for the relevant data is performed.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computer program product that includes a non-transitory computer readable medium useable by a machine, the medium having stored thereon a sequence of instructions which, when executed by the machine, causes the machine to transform a data source into a predetermined format, wherein the machine executes:
    maintaining a comprehensive listing of data sources in a data source repository;
    acquiring real time information pertaining to at least one data source, wherein the real time information includes:
    reference information that is associated with the data source,
    data transformation specification information that is associated with the data source, the data transformation specification information that is associated with the data source being stored in a transformation specification repository, and
    scheduled event specification information that is associated with the data source,
    maintaining the real time information;
    acquiring data from the data source in accordance with at least one specified scheduled event identified in the scheduled event specification information, the acquiring from the data source being performed at a rate that complies with performance limitations of the data source;
    converting the real time stream acquired data into a predetermined standardized and normalized format, wherein the extracted data is normalized in a per fact basis into a XML document;
    performing at least one data transformation function from the real time stream upon the converted data in accordance with the acquired data transformation specification information stored in a transformation specification repository that was associated with the data source; and
    transmitting the transformed data to a destination data source;
    wherein changes to the data sources, transformation specification information, and scheduled event specification information are provided to a maintenance module to update a registry including:
    detecting a change;
    determining what type of configuration modification is to be made:
        if the change is to be made to the data transformation specification, then a transformation specification repository is accessed and the modifications are performed to the data transformation specification;
        if the change is to be made to the data source repository, then accessing the data source repository and modifying the configuration for the relevant data:
        if the change is to be made to the scheduled event specification information, then accessing the scheduled event specification information and modifying the configuration for the relevant data.

* * * * *